Patented Nov. 17, 1953

2,659,745

UNITED STATES PATENT OFFICE 2,659,745

MIXED ANHYDRIDES BETWEEN CARBOXYLIC AND SUBSTITUTED ARSENOUS ACIDS

James R. Vaughan, Jr., Glenbrook, Conn., assignor to American Cyanamid Company, New York, N. Y., a corporation of Maine No Drawing. Application February 1, 1951, Serial No. 208,988

17 Claims. (Cl. 260—440)

This invention relates to mixed anhydrides of carboxylic acids and arsenite esters.

The new compounds of this invention, which are referred to in the specification and claims as mixed anhydrides of arsenite esters, or mixed anhydrides of diesters of arsenous acid and carboxylic acids, may be more specifically illustrated by the following structural formula:

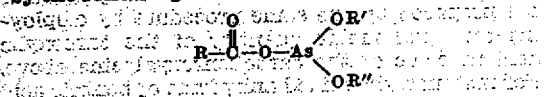

in which R is an organic radical and in which R' and R" are the same or different nonfunctional esterifying radicals.

The radicals represented by R' and R" are connected to the oxygen by a carbon to oxygen linkage and are preferably hydrocarbon radicals as illustrated by the following: lower alkyl, for instance ethyl, butyl and amyl; aromatic, for instance phenyl and tolyl; aralkyl, for instance benzyl. However, other types of radicals are also suitable as these groups may be varied within wide limits without appreciably affecting the chemical properties of the anhydride. It is believed that one skilled in the art will have little difficulty selecting suitable radicals for R' and R".

R in the above formula may represent any organic radical capable of being attached to a carboxyl group. Examples of suitable radicals which may be represented by R are: aliphatic, for instance ethyl, methyl, propyl, butyl, and butenyl; substituted aliphatic, for instance, benzyl, chloroethyl, carboxyethyl,

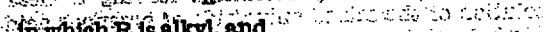

in which R is alkyl, and

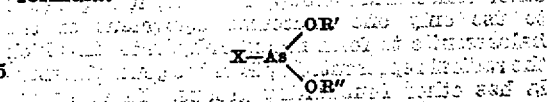

in which R is alkyl; aromatic, for instance phenyl and naphthyl; substituted aromatic, for instance chlorophenyl, nitrophenyl and tolyl; heterocyclic, for instance piperidyl. As will be more fully explained in the following paragraphs, the radical to be represented by R in the above formula depends upon the carboxylic acid employed in making the anhydride. Many suitable acids are set forth in subsequent paragraphs of this specification.

Generally speaking, the new compounds of this invention are oily liquids which freeze into non- crystalline glasses, and which decompose on attempted distillation. They are infinitely soluble in most of the common organic solvents, and form relatively stable solutions therein. The new compounds are useful as intermediates in organic synthesis. For example, the new compounds may be employed in the synthesis of amides as disclosed in my copending U. S. application, S. N. 208,989, filed concurrently herewith. It is intended, however, that this invention cover the new compounds per se and it is not to be construed as being limited to any particular field or fields of utility.

While it is not intended that this invention be limited to the new anhydrides produced by any specific process, a particularly convenient method of preparing the new compounds has been discovered and this new method also constitutes a part of this invention. The new method comprises reacting a carboxylic acid or salt thereof with a compound such as represented by the formula:

$$X-As\begin{matrix}OR'\\OR''\end{matrix}$$

where X is halogen and R' and R" are as defined above. Compounds of the above type are referred to in the specification and claims as haloarsenites or as diesters of arsenous halides. Because of the ease of preparation and their advantageous reaction velocity the chloroarsenites are the preferred haloarsenites.

The reaction is conveniently performed in an inert solvent. Examples of suitable solvents are: benzene, toluene, xylene, or other aromatic hydrocarbons; chloroform or other halogenated aliplatics; normal octane or other aliphatic hydrocarbons; cyclohexane or other alicyclic hydrocarbon solvents; ethyl acetate or other of the lower aliphatic esters; ethyl ether or other lower aliphatic ethers; methyl butyl ketone or other lower aliphatic ketones; dioxane or other cyclic ethers. Choice of solvent will depend primarily upon convenience, but as the new class of compounds are useful principally as intermediates in processes where they may be utilized without isolation from the solvent, in many instances the intended use will affect the choice of solvent.

As halide ions are released during the reaction it is usually advantageous to have present in the reaction mixture basic ions capable of forming insoluble salts with the halide ions. This can conveniently be done by employing as a reactant in the process, a carboxylic acid salt such as one formed with triethylamine or other tertiary amine. The salts of the carboxylic acids with metals such as silver, calcium, sodium, etc., are also satisfactory. Of course, if it is so desired, the halide ions may be neutralized after the reaction is complete as the reaction will proceed in their presence.

The reaction proceeds readily at room temperature or at any other convenient temperature up to the decomposition temperature of the reaction product. As a matter of convenience one is usually limited to a range between the freezing and reflux temperatures of the solvent employed. Temperatures between 0° C. and 110° C. are preferred.

The reaction proceeds immediately upon mixing the two reactants as is evidenced, when the anhydride is made from a salt such as described above, by precipitation of the amine hydrochloride, or of the metal chloride. Even at low temperatures, for instance 0° C., the reaction is substantially complete in a very few minutes.

The carboxylic acids suitable for the process of this invention are any of the available monocarboxylic or polycarboxylic acids. Suitable acids may be illustrated by the following: aliphatic carboxylic acids, for instance acetic, propionic, butyric, caprylic, and oleic; polybasic acids, for instance malonic, succinic, adipic, and sebacic; substituted aliphatic acids, for instance monochloroacetic, and R—CO—NH—CH$_2$—COOH where R is aromatic, aralkyl or alkyl; aromatic, for instance benzoic, and naphthalic; heterocyclic acids, for instance nicotinic, and thiophene carboxylic; alicyclic acids, for instance cyclohexane-carboxylic acid.

If the mixed anhydrides are prepared from carboxylic acids having more than one functioning group, that is, groups having active hydrogen, sufficient haloarsenite may, if desired, be employed to react with both the carboxy and the other functioning group; however, it is possible to use only one molecular equivalent of the haloarsenite to form mixed anhydrides in which the radical represented by R in the general formula has other functioning groups. In preparing such anhydrides, it is usually advantageous to conduct the reaction at temperatures below about 30° C. to minimize side reactions. For instance, the monoanhydride of a dicarboxylic acid may be prepared in fair yield in this manner. Anhydrides in which the radical represented by R in the general formula does contain a functioning group decompose at somewhat lower temperatures than otherwise because of an interaction of the functioning group with the anhydride itself, and if the mixed anhydrides are to be used as intermediates, it is advisable to temporarily block the second functioning group of the carboxylic acid by, for instance, acylation or substitution before making the anhydride.

The new compounds of this invention are of particular interest when made from the acylated naturally occurring aminoacids, for they are of great value in making optically active peptides and polypeptides according to the procedure of my above-mentioned copending application. Examples of such amino acids are: alanine, valine, norvaline, leucine, norleucine, isoleucine, phenylalanine, tyrosine, serine, cysteine, methionine, aspartic acid, glutamic acid, lysine, ornithine, asparagine, histidine, and tryptophane. Generally speaking, the naturally occurring aminoacids such as the above may be spoken of as alpha aminoacids having from two to twelve carbon atoms.

The invention will be more particularly illustrated by the following examples in which all parts are by weight unless otherwise specified:

*Example I*

A solution of 4.18 parts by weight of carbobenzoxyglycine and 2.04 parts by weight of triethylamine in 50 parts by volume of toluene is prepared and to this is added dropwise 4.0 parts by weight of chlorodiethylarsenite. An exothermic reaction occurs. The resulting precipitate of triethylamine hydrochloride is removed by filtration leaving a clear solution of the mixed anhydride of arsenous acid diethyl ester and carbobenzoxyglycine. The mixed anhydride is obtained as a colorless oil by careful evaporation of the solvent in vacuo.

In place of the chlorodiethylarsenite in the above example, bromodiethylarsenite may be employed with good results. Likewise, other chloroarsenites, for instance chlorodiamylarsenite, chlorodiphenylarsenite and chlorodibenzylarsenite, may be employed in place of the chlorodiethylarsenite above to produce mixed anhydrides of other diesters of arsenous acid.

Mixed anhydrides of other carboxylic acids are prepared by the same procedure by employing an equal molar quantity of the carboxylic acid in place of the carbobenzoxyglycine above. For instance, the mixed anhydride of benzoic acid is prepared by substituting benzoic acid for the carbobenzoxyglycine in the above example.

*Example II*

To a solution of 4.46 parts by weight of carbobenzoxy-dl-alanine and 2.04 parts by weight of triethylamine in 50 parts by volume of toluene there is added 4.01 parts by weight of chlorodiethylarsenite in portions with stirring. After several minutes the reaction mixture is cooled and the precipitate of triethylamine hydrochloride removed by filtration leaving a clear solution of the mixed anhydride of arsenous acid diethyl ester and carbobenzoxy-dl-alanine. The mixed anhydride can be obtained as an oil by vacuum distillation of the solvent or the mixed anhydride can be employed in subsequent reactions without isolation.

*Example III*

To a solution of 5.31 parts by weight of carbobenzoxy-L-leucine and 2.04 parts by weight of triethylamine in 50 parts by volume of toluene there is added 4.01 parts by weight of chlorodiethylarsenite. After several minutes the reaction mixture is cooled and the triethylamine hydrochloride removed by filtration, leaving a clear solution of the mixed anhydride of arsenous acid diethyl ester and carbobenzoxy-L-leucine. The mixed anhydride can be obtained as an oil by vacuum distillation of the solvent or the mixed anhydride can be employed in subsequent reactions without isolation.

*Example IV*

In about 30 parts by volume of toluene there is dispersed 2.66 parts by weight of carbobenzoxyglycylglycine and 1.02 parts by weight of triethylamine and the mixture heated for ten to fifteen minutes until salt formation is complete. There is then added 2.01 parts by weight of chlorodiethylarsenite and the heating continued for an additional five to ten minutes. The mixed anhydride can be obtained as an oil by removing the triethylamine hydrochloride by filtration and vacuum distillation of the solvent or the mixed anhydride can be employed in subsequent reactions without isolation.

Example V

To a solution of 2.09 parts by weight of carbobenzoxyglycine and 1.02 parts by weight of triethylamine in 40 parts by volume of dry toluene there is added a warm solution of chloro-o-phenylenearsenite in about 50 parts by volume of toluene. Triethylamine hydrochloride precipitates immediately. The reaction mixture is heated to the boiling point for several minutes, then cooled and the insoluble triethylamine hydrochloride removed by filtration, leaving a clear solution of the mixed anhydride of arsenous acid o-phenylenediester and carbobenzoxyglycine. The mixed anhydride can be obtained as an oil by vacuum distillation of the solvent or the mixed anhydride can be employed in subsequent reactions without isolation.

I claim:

1. A mixed anhydride of a diester of arsenous acid and a carboxylic acid represented by the formula:

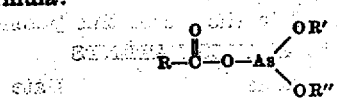

in which

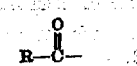

represents an acyl group and in which R' and R'' represent nonfunctional esterifying radicals.

2. A mixed anhydride of a diester or arsenous acid and an alpha-acidamidocarboxylic acid represented by the formula:

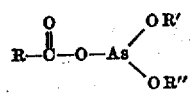

in which R' and R'' represent hydrocarbon esterifying radicals and

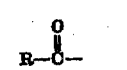

represents an acyl group derived from said alpha-acid-amidocarboxylic aci dand R' and R'' represent hydrocarbon esterifying radicals.

3. A mixed anhydride of a diester of arsenous acid and an acidamidoacetic acid represented by the formula:

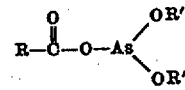

in which

represents an acyl group derived from said acid-amido-carboxylic acid and R' and R'' represent hydrocarbon esterifying radicals.

4. A mixed anhydride of arsenous acid diethyl ester and carbobenzoxyglycine as represented by the formula:

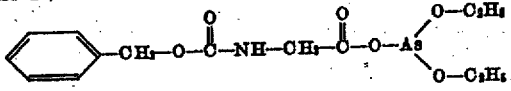

5. A mixed anhydride of a diester of arsenous acid and an alpha-acidamidopropionic acid represented by the formula:

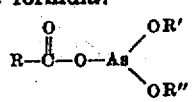

in which R' and R'' represent hydrocarbon esterifying radicals and

represent an acyl group derived from said alpha-acidamidopropionic acid.

6. A mixed anhydride of arsenous acid diethyl ester and carbobenzoxyalanine as represented by the formula:

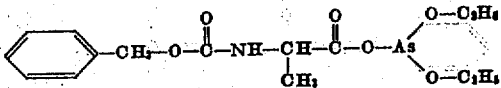

7. A mixed anhydride of a diester of arsenous acid and an optically active alpha-acidamidocarboxylic acid represented by the formula:

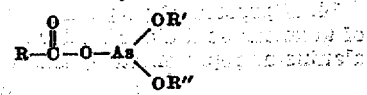

in which

represents an acyl group derived from said optically active alpha-acidamidocarboxylic acid and R' and R'' represent hydrocarbon esterifying radicals.

8. A mixed anhydride of arsenous acid diethyl ester and carbobenzoxy-L-leucine as represented by the formula:

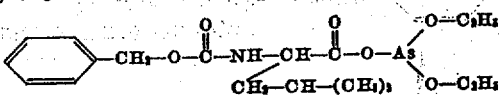

9. A mixed anhydride of arsenous acid diethyl ester and carbobenzoxyglycylglycine as represented by the formula:

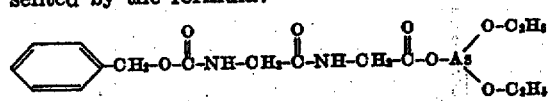

10. A mixed anhydride of arsenous acid o-phenylenediester and carbobenzoxyglycine as represented by the formula:

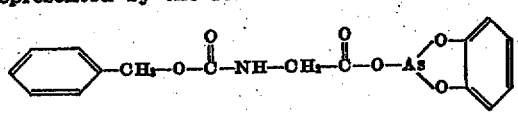

11. A process of preparing mixed anhydrides of diesters of arsenous acid and carboxylic acids of the formula:

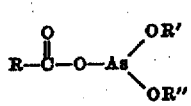

in which

represents an acyl group and in which R' and R'' represent nonfunctional esterifying radicals which comprises reacting a compound selected from the group consisting of carboxylic acids and salts thereof, with a diester of an arsenous acid halide represented by the formula:

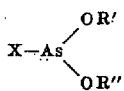

in which X represents halogen and R' and R'' are as defined above.

12. A process of preparing mixed anhydrides of diesters of arsenous acid and alpha-acidamidocarboxylic acids which comprises reacting a tertiary amine salt of an alpha-acidamidocarboxylic acid with diethylchloroarsenite.

13. A process of preparing a mixed anhydride of arsenous acid diethyl ester and carbobenzoxyglycine as represented by the formula:

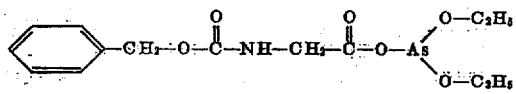

which process comprises reacting in an inert solvent, diethylchloroarsenite with a tertiary amine salt of carbobenzoxyglycine.

14. A process of preparing a mixed anhydride of arsenous acid diethyl ester and carbobenzoxyalanine as represented by the formula:

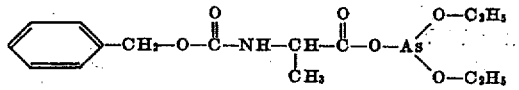

which process comprises reacting in an inert solvent, diethylchloroarsenite with a tertiary amine salt of carbobenzoxyalanine.

15. A process of preparing a mixed anhydride of arsenous acid diethyl ester and carbobenzoxy-L-leucine as represented by the formula:

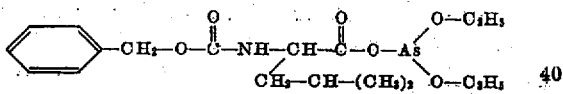

which process comprises reacting in an inert solvent, diethylchloroarsenite with a tertiary amine salt of carbobenzoxy-L-leucine.

16. A process of preparing a mixed anhydride of arsenous acid diethyl ester and carbobenzoxyglycylglycine as represented by the formula:

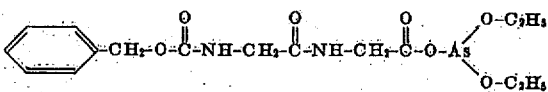

which process comprises reacting in an inert solvent, diethylchloroarsenite with a tertiary amine salt of carbobenzoxyglycylglycine.

17. A process of preparing a mixed anhydride of arsenous acid o-phenylenediester and carbobenzoxyglycine as represented by the formula:

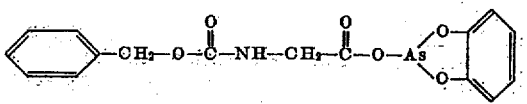

which process comprises reacting in an inert solvent, chloro-o-phenylenearsenite with a tertiary amine salt of carbobenzoxyglycine.

JAMES R. VAUGHAN, Jr.

References Cited in the file of this patent

UNITED STATES PATENTS

| Number | Name | Date |
|---|---|---|
| 2,405,988 | Barry | Aug. 20, 1946 |

OTHER REFERENCES

Pictet, Bull. Soc. Chem. de Paris, vol. 33 (1905), pages 1139–1143.

Certificate of Correction

Patent No. 2,659,745                                                      November 17, 1953

James R. Vaughan, Jr.

It is hereby certified that error appears in the printed specification of the above numbered patent requiring correction as follows:

Column 5, line 38, for "diester or" read *diester of*; lines 45 and 46, strike out "R′ and R″ represent hydrocarbon esterfying radicals and"; line 51, for "aci dand" read *acid and*; column 6, line 12, for "represent" read *represents*; and that the said Letters Patent should be read as corrected above, so that the same may conform to the record of the case in the Patent Office.

Signed and sealed this 9th day of February, A. D. 1954.

[SEAL]

ARTHUR W. CROCKER,
*Assistant Commissioner of Patents.*